United States Patent
Komatsu

(10) Patent No.: US 7,605,798 B2
(45) Date of Patent: Oct. 20, 2009

(54) ELECTRO-OPTIC DEVICE AND ELECTRONIC INSTRUMENT

(75) Inventor: Yuko Komatsu, Suwa (JP)

(73) Assignee: Seiko Epson Corporation (JP)

( * ) Notice: Subject to any disclaimer, the term of this patent is extended or adjusted under 35 U.S.C. 154(b) by 772 days.

(21) Appl. No.: 11/332,869

(22) Filed: Jan. 13, 2006

(65) Prior Publication Data
US 2006/0187189 A1 Aug. 24, 2006

(30) Foreign Application Priority Data
Feb. 21, 2005 (JP) .............................. 2005-043533

(51) Int. Cl.
G09G 3/34 (2006.01)
(52) U.S. Cl. ..................................... 345/107
(58) Field of Classification Search .................. 345/89, 345/90, 96–98, 100, 103, 107, 208, 209; 359/566, 569, 35, 296; 347/239; 385/16, 385/130, 142; 349/201
See application file for complete search history.

(56) References Cited

U.S. PATENT DOCUMENTS

| 6,791,740 B2 | 9/2004 | Katase |
| 6,975,298 B2 * | 12/2005 | Koyama et al. ............. 345/98 |
| 7,339,737 B2 * | 3/2008 | Urey et al. ................. 359/566 |
| 7,492,348 B2 | 2/2009 | Matsuda |
| 2004/0027327 A1 * | 2/2004 | LeCain et al. .............. 345/107 |
| 2004/0169630 A1 * | 9/2004 | Ide .............................. 345/96 |
| 2004/0196235 A1 * | 10/2004 | Koyama et al. ............. 345/89 |
| 2005/0062714 A1 * | 3/2005 | Zehner et al. .............. 345/107 |
| 2005/0237615 A1 * | 10/2005 | Urey et al. ................. 359/566 |

FOREIGN PATENT DOCUMENTS

| JP | 2003-084314 | 3/2003 |
| JP | 2004-004714 | 1/2004 |
| JP | 2004-101938 | 4/2004 |
| JP | 2005-031264 | 2/2005 |

* cited by examiner

Primary Examiner—Prabodh M Dharia
(74) Attorney, Agent, or Firm—Harness, Dickey & Pierce P.L.C.

(57) ABSTRACT

An electro-optic device includes spaced apart pixel electrodes in respective unit areas arranged in a plane defined by dividing the plane into common shapes without gaps, and an electro-optic layer facing the pixel electrodes. In response to an applied first electric potential to the pixel electrodes, the electro-optic layer expresses a first grayscale, and in response to an applied second electric potential, it expresses a second grayscale. The distance between adjacent pixel electrodes is selected so that a boundary between an area expressing the first grayscale and an area expressing the second grayscale is substantially identical to a boundary between the unit area provided with one of the adjacent pixel electrodes and the unit area provided with another of the adjacent pixel electrodes.

9 Claims, 9 Drawing Sheets

<DISTANCE d: APPROPRIATE VALUE>

ELECTRO-OPTIC DEVICE AND ELECTRONIC INSTRUMENT

BACKGROUND OF THE INVENTION

1. Technical Field

The present invention relates to a technology for controlling the behavior of various kinds of electro-optic materials such as charged microparticles (hereinafter referred to as electrophoretic particles) by applying them with voltages.

2. Related Art

The electro-optic devices utilizing these kinds of electro-optic materials have been conventionally proposed as display devices for various electronic instruments. For example, JPA-2004-4714 (Paragraph No. 0103 and FIG. 1) and JPA-2003-84314 (Paragraph No. 0003 and FIG. 9) disclose an electro-optic device having an electro-optic layer 50 intervening in a gap between a first substrate 10 and a second substrate 20 facing each other as shown in FIG. 19. The electro-optic layer 50 is a layer in which positively charged black electrophoretic particles and negatively charged white electrophoretic particles are dispersed in a dispersion medium (both omitted from the drawings).

In the surfaces of the first substrate 10 positioned in the reverse side, the surface facing the electro-optic layer 50 is provided with a lot of pixel electrodes 15 (15a and 15b) arranged in a matrix with a distance from each other. Meanwhile, in the surfaces of the second substrate 20 positioned in the observation side, the surface facing the electro-optic layer 50 is provided with an opposed electrode 21 formed in the entire surface. In this configuration, when a positive electric potential VH with reference to the electric potential of the opposed electrode 21 is applied to either of the pixel electrodes 15, the white electrophoretic particles move closer to the first substrate 10 and the black electrophoretic particles move closer to the second substrate 20 resulting in a black grayscale in a portion corresponding to this one of the pixel electrodes 15. As described above, by controlling the dispersion state of the black and white electrophoretic particles for each of the pixel electrodes 15, a desired image can be displayed.

Meanwhile, in this configuration, the electrophoretic particles migrating closer to the second substrate 20 are distributed in an area wider than each of the pixel electrodes 15. For example, as shown in FIG. 19, the case in which the electric potential VH is applied to one pixel electrode 15a and an electric potential VL lower than the electric potential VH is applied to an adjacent pixel electrode 15b (namely, the pixel electrode 15a displays black while the pixel electrode 15b displays white) is assumed. In this case, an electric flux line L1 from the center of the pixel electrode 15a to the opposed electrode 21 extends in a direction substantially perpendicular to the surface of the pixel electrode 15a. However, an electric flux line L2 from the periphery of the pixel electrode 15a is vent towards the pixel electrode 15b in consequence of the electric potential VL applied to the pixel electrode 15b as shown in FIG. 19. As a result, the black electrophoretic particles moving closer to the second substrate 20 are distributed in an area Rb larger than an area R. Therefore, a high-definition display is problematically inhibited. For example, a black line in a white background is displayed wider than a white line in a black background. Note that, although the electro-optic device utilizing the electrophoretic particles is particularly described here, the same problem can arise in electro-optic devices utilizing other electro-optic materials such as liquid crystal.

SUMMARY

In view of the technical background described above, an advantage of the invention is to precisely display a desired image even if the different electric potentials are applied respectively to the pixel electrodes adjacent to each other.

In view of the above technical problem, an electro-optic device according to a first aspect of the invention includes a plurality of pixel electrodes each formed for respective unit areas with a distance between one of the pixel electrodes and another of the pixel electrodes adjacent to the one of the pixel electrodes, the unit areas being arranged in a plane and defined by dividing the plane into the same shapes without a gap, and an electro-optic layer that faces each of the pixel electrodes, and in response to application of a first electric potential to each of the pixel electrodes, expresses a first grayscale in an area corresponding to each of the pixel electrodes, in response to application of a second electric potential different form the first electrical potential to each of the pixel electrodes, expresses a second grayscale different from the first grayscale in an area corresponding to each of the pixel electrodes. In this case, the distance between one of the pixel electrodes and another of the pixel electrodes adjacent to the one of the pixel electrodes is selected so that a boundary between an area expressing the first grayscale in response to application of the first electric potential to the one of the pixel electrodes and an area expressing the second grayscale in response to application of the second electric potential to the another of the pixel electrodes adjacent to the one of the pixel electrodes is substantially identical to a boundary between the unit area provided with the one of the pixel electrodes and the unit area provided with the another of the pixel electrodes (which is described in detail in a first embodiment as a first condition).

According to this configuration, since the distance between the pixel electrodes is selected so that the boundary between the area expressing the first grayscale in response to application of the first electric potential to the one of the pixel electrodes and the area expressing the second grayscale in response to application of the second electric potential to another of the pixel electrodes adjacent to the one of the pixel electrode is substantially identical to the boundary between the unit area provided with the one of the pixel electrodes and the unit area provided with the another of the pixel electrodes, even if the electric flux line corresponding to the electric potential of the pixel electrode is bent toward the adjacent pixel electrode, a precise image can be displayed using each of the unit areas as the minimum unit. Further, compared to the case in which the advantage is obtained by other methods such as controlling the electric potential applied to each of the pixel electrodes or adjusting the characteristics of the electro-optic layer, it is also advantageous that the above advantage can be obtained with the extremely simple configuration of appropriately selecting the distance between the pixel electrodes.

Note that in the invention, the words "substantially identical" in the phrase of "the boundary between the area of the first grayscale and the area of the second grayscale is substantially identical to the boundary of each of the unit areas" means that they come such closer to each other or match to the extent (substantially the same) that the observer of the images displayed by the electro-optic device according to the invention recognizes that the area with the first grayscale and the area with the second grayscale have the same shapes and are arranged without gaps as is the case with the unit areas, but does not require that they are completely identical in the strict sense.

Further, an electro-optic device according to a second aspect of the invention includes a plurality of pixel electrodes arranged in a plane with a distance from an adjacent one of the pixel electrodes, an electro-optic layer that faces each of the pixel electrodes, and in response to application of a first electric potential to each of the pixel electrodes, expresses a first grayscale in an area corresponding to each of the pixel electrodes, in response to application of a second electric potential different form the first electrical potential to each of the pixel electrodes, expresses a second grayscale different from the first grayscale in an area corresponding to each of the pixel electrodes. In this case, the distance from an adjacent one of the pixel electrodes is selected so that a boundary between an area expressing the first grayscale in response to application of the first electric potential to one of the pixel electrodes and an area expressing the second grayscale in response to application of the second electric potential to another of the pixel electrodes adjacent to the one of the pixel electrodes is substantially identical to a boundary between an area expressing the second grayscale in response to application of the second electric potential to the one of the pixel electrodes and an area expressing the first grayscale in response to application of the first electric potential to the another of the pixel electrodes adjacent to the one of the pixel electrodes (which is described in detail in a first embodiment as a second condition).

According to this configuration, since the distance between the pixel electrodes is selected so that the boundary between the area expressing the first grayscale in response to application of the first electric potential to the one of the pixel electrodes and the area expressing the second grayscale in response to application of the second electric potential to another of the pixel electrodes adjacent to the one of the pixel electrode is substantially identical to the boundary between the area expressing the second grayscale in response to application of the second electric potential to the one of the pixel electrodes and the area expressing the first grayscale in response to application of the first electric potential to the another of the pixel electrodes, even if the electric flux line corresponding to the electric potential of the pixel electrode is bent toward the adjacent pixel electrode, a precise image can be displayed using each of the unit areas as the minimum unit. Note that meaning of the words "substantially identical" in the configuration of the second aspect on the invention is the same as those in the first aspect of the invention.

Further, an electro-optic device according to a third aspect of the invention includes a plurality of unit electrode group each including a predetermined number of pixel electrodes arranged in a plane with a distance from an adjacent one of the pixel electrodes, and an electro-optic layer that faces each of the pixel electrodes, and in response to application of a first electric potential to each of the pixel electrodes, expresses a first grayscale in an area corresponding to each of the pixel electrodes, in response to application of a second electric potential different form the first electrical potential to each of the pixel electrodes, expresses a second grayscale different from the first grayscale in an area corresponding to each of the pixel electrodes. In this case, the first grayscale, the second grayscale, and a intermediate grayscale between the first grayscale and the second grayscale are expressed for each of the unit electrode groups by applying the first electric potential to the number of pixel electrodes out of the predetermined number of the pixel electrodes forming the unit electrode group corresponding to a grayscale value designated to the unit electrode group while applying the second electric potential different from the first electric potential to the remaining pixel electrodes in the unit electrode group, and the distance from an adjacent one of the pixel electrodes is selected so that the whole of one of the unit electrode groups including the pixel electrodes and a gap between the pixel electrodes expresses the first grayscale in response to designation of specific grayscale to the one of the unit electrode groups, and a ratio (the reflectance shown in FIG. 15) of the total area expressing the first grayscale and the total area expressing the second grayscale is in proportion to the grayscale value designated to the one of the unit electrode groups (which is described in detail in a second embodiment as a third condition).

According to this configuration, since the distance between the pixel electrodes is selected so that the whole of one unit electrode group including each of the pixel electrodes included in this unit electrode group and each of the gaps becomes to express the first grayscale in response to designation of the specific grayscale value to the one unit electrode group, and the ratio (the reflectance in the second embodiment) of the total area expressing the first grayscale and the total area expressing the second grayscale in the area corresponding to one unit electrode group is in proportion to the grayscale value, even if the electric flux line corresponding to the electric potential of the pixel electrode is bent toward the pixel electrode adjacent to the present pixel electrode, the difference in the grayscale can clearly be recognized by the observer with an extremely simple configuration of selecting the distance between the pixel electrodes, and further, the grayscale actually recognized by the observer can naturally be changed in accordance with the grayscale value.

The electro-optic layer in the invention is a layer having a nature of changing the optical characteristics such as transmittance or reflectance in accordance with the electric potential applied to the pixel electrode. Layers made of various electro-optic materials such as the electrophoretic dispersion liquid dispersing the electrophoretic particles or liquid crystal fall under the electro-optic layer in the invention. Note that, in the electro-optic device (so called electrophoretic display device) utilizing the electrophoretic dispersion liquid, resulting from the configuration in which the electrophoretic particles freely migrate in the dispersion medium, the problem that the boundary between the area with the first grayscale and the area with the second grayscale is fluctuated by the electric field in the tilted direction becomes particularly prominent. Therefore, the invention can be said particularly suitable for the electrophoretic display device equipped with the electro-optic layer having the charged particles dispersed in the dispersion medium.

The electro-optic device according to the invention can be applied as display devices of various electronic instruments. As such an electronic instrument, for example, an electronic book or a cellular phone can be cited. The electrophoretic display device applying the invention is particularly suitable for the electronic book or an electronic paper.

BRIEF DESCRIPTION OF THE DRAWINGS

The invention will now be described with reference to the accompanying drawings, wherein like numbers refer to like elements.

DESCRIPTION OF THE EMBODIMENTS

A: First Embodiment

Figure 1:
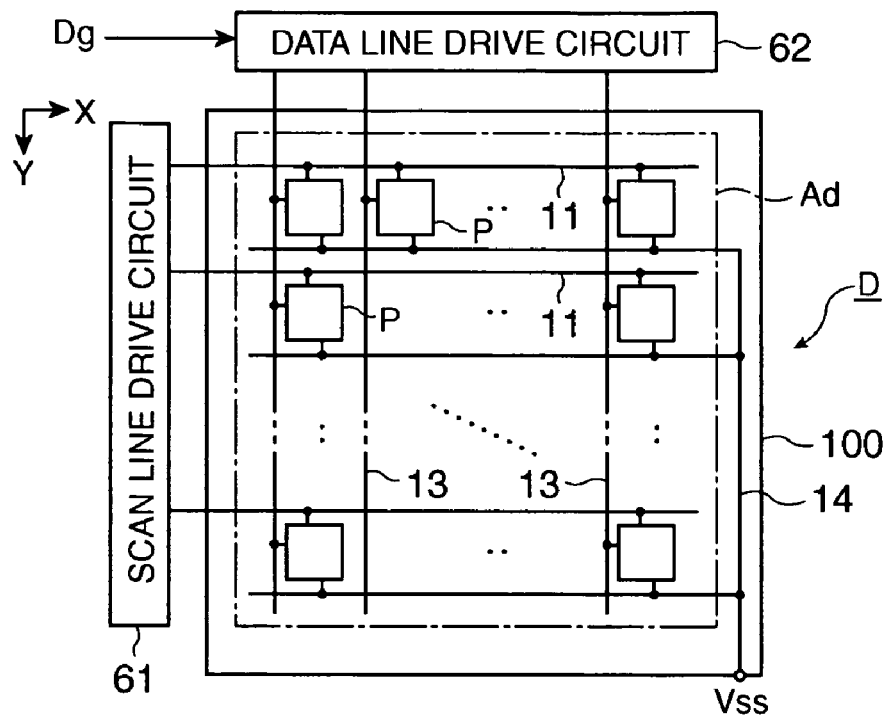
FIG. 1 is a block diagram showing an electrical configuration of an electro-optic device according to a first embodiment of the invention.

FIG. 1 is a block diagram showing an electrical configuration of an electro-optic device according to a first embodiment of the invention. As shown in the figure, the electro-optic device D includes an electro-optic panel 100 for displaying images in a display area Ad, and a scan line drive circuit 61 and a data line drive circuit 62 both for driving the electro-optic panel 100. The electro-optic panel 100 includes a plurality of scan lines 11 extending in the X direction and connected to the scan line drive circuit 61, a plurality of data lines 13 extending in the Y direction perpendicular to the X direction and connected to the data line drive circuit 62, and a power supply line 14 supplied with a predetermined electric potential Vss. A pixel P is disposed at an intersection of each of the scan lines 11 and each of the data lines 13. Therefore, these pixels P are arranged in a matrix in both the X direction and the Y direction throughout the display area Ad. The power supply line 14 is connected to every pixel P to supply the electric potential Vss.

Figure 2:
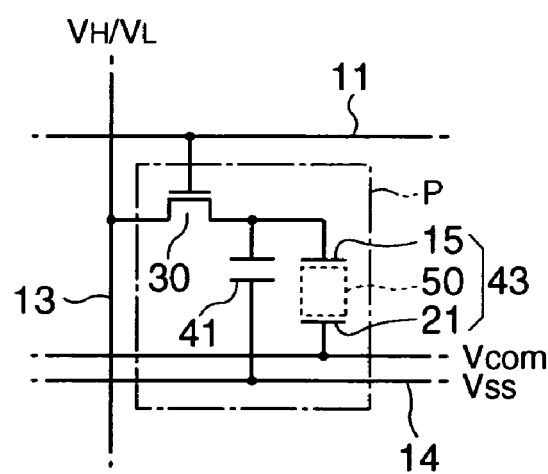
FIG. 2 is a circuit diagram showing a configuration of a single pixel.

FIG. 2 is a circuit diagram showing a configuration of a single pixel P. As shown in the figure, each of the pixels P includes an n channel transistor (e.g., a thin film transistor) 30 of which the gate electrode is connected to the scan line 11 and the drain electrode is connected to the data line 13, a holding capacitor 41 intervening between the source electrode of the transistor 30 and the power supply line 14, and an electro-optic element 43 connected to the source electrode of the transistor 30. The electro-optic element 43 is an element having the pixel electrode 15 and the opposed electrode 21 facing each other, and the electro-optic layer 50 intervening between the electrodes. The pixel electrode 15 is individually formed for each of the pixels P and the opposed electrode 21 is commonly formed for the plurality of pixels P. A predetermined electric potential (hereinafter referred to as common electric potential) Vcom is applied to the opposed electrode 21.

The scan line drive circuit 61 sequentially selects the plurality of scan lines 11 to apply an electric potential for switching on the transistor 30 to the selected scan line 11. The data line drive circuit 62 supplies each of the pixels P in the line connected to the scan line 11 selected by the scan line drive circuit 61 with electric potentials (hereinafter referred to as data electric potentials) corresponding to grayscales of the respective pixels P via the respective data lines 13. The grayscale of each of the pixels P is designated by image data Dg. The image data Dg is binary data for designating either a grayscale corresponding to white or a grayscale corresponding to black for each of the pixels P, and is supplied to the data line drive circuit 62 from various higher-level devices such as a CPU (Central Processing Unit) of an electronic instrument in which the electro-optic device D is implemented. The data line drive circuit 62 supplies the data line 13 with the electric potential VH as the data potential when the image data Dg for one of the pixels P designates the grayscale of black, and supplies the data line 13 with the electric potential VL as the data potential when the image data Dg designates the grayscale of white. The electric potential VH is higher than the electric potential VL. Under the configuration described above, the data electric potential, which is applied to the data line 13 by the scan line drive circuit 61 while the transistor 30 is in the on-state, is held by the holding capacitor 41 and applied to the pixel electrode 15 via the transistor 30. And, even after the selection by the scan line drive circuit 61 is terminated to switch off the transistor 30, the data electric potential held by the holding capacitor 41 is continuously applied to the pixel electrode 15. The electro-optic layer 50 intervening between the pixel electrode 15 and the opposed electrode 21 becomes to have a grayscale corresponding to the potential difference between the both electrodes.

Figure 3:
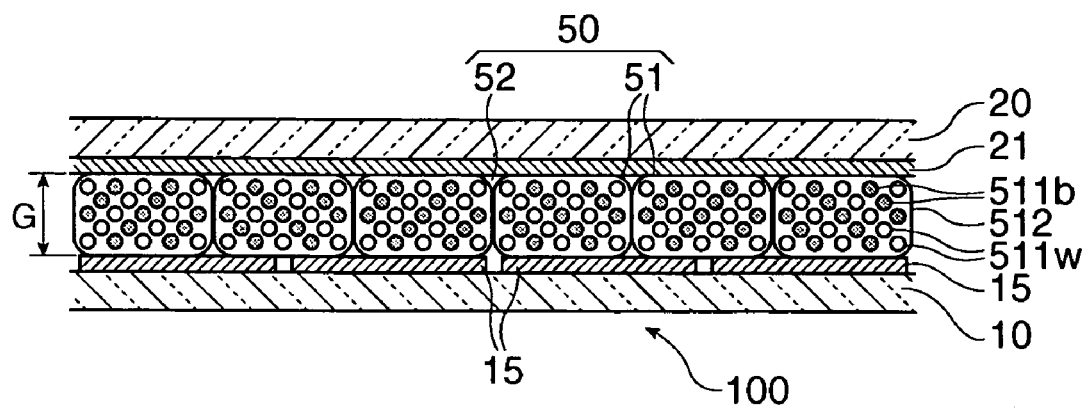
FIG. 3 is a cross-sectional view showing a structure of an electro-optic device.

Meanwhile, FIG. 3 is a cross-sectional view showing the configuration of the electro-optic device D. As shown in the figure, the electro-optic device D includes the first substrate 10 and the second substrate 20 bonded with each other so as to face each other. The first substrate 10 and the second substrate 20 are hard plate members made of glass or flexible plate members made of a resin material. In the present embodiment, the opposite side to the first substrate 10 across the second substrate 20 is set to be the observation side (i.e., the side in which the observer who watches the image displayed by the electro-optic panel 100 is positioned). Accordingly, the second substrate 20 is composed of a material having light permeability. In surfaces of the second substrate 20, the surface facing the first substrate 10 is provided with the opposed electrode 21 formed to cover the entire surface. The opposed electrode 21 is a film member made of an electrically conductive material with light permeability such as ITO (Indium Tin Oxide).

The electro-optic layer 50 is disposed in the gap between the first substrate 10 and the second substrate 20. The electro-optic layer 50 in the present embodiment contains a lot of microcapsules 51 and a binder member 52 for fixing the positions of the microcapsules 51. In the microcapsules 51, there is encapsulated an electrophoretic dispersion liquid composed of positively charged black electrophoretic particles 511b, negatively charged white electrophoretic particles 511w, and a fluid dispersion medium 512 dispersing the electrophoretic particles. The electrophoretic particles 511 (511b, 511w) can freely merge in the dispersion medium 512.

Figure 4:
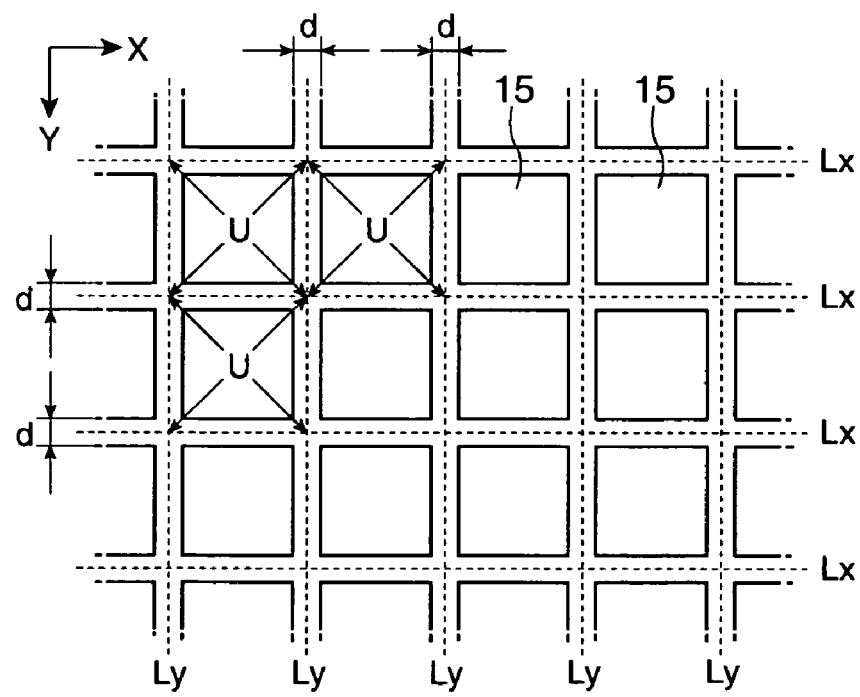
FIG. 4 is a plan view showing an arrangement of pixel electrodes.

As shown in FIG. 3, each of the pixel electrodes 15 is a substantially rectangular electrode formed on the surface of the first substrate 10, the surface facing the second substrate 20. The pixel electrode 15 can be made of an electrically conductive material having light permeability such as ITO or can be made of an electrically conductive material having light reflectivity such as aluminum, silver, or alloys composed mainly of these metals. FIG. 4 is a plan view showing an arrangement of the pixel electrodes 15 on the surface of the first substrate 10 (i.e., a plan view showing the configuration of the first substrate 10 viewed from the second substrate 20 side). As shown in the figure, the surface of the first substrate 10 is partitioned into a number of rectangular areas (hereinafter referred to as unit areas) U with boundaries of a line Lx extending in the X direction and a line Ly extending in the Y direction. Each of the unit areas U is an area having the same shape (a square shape in the present embodiment) arranged in a matrix in both the X direction and the Y direction without a gap. Each of the pixel electrodes 15 is formed for the respective unit areas U with distances d from the adjacent ones in the X and the Y directions.

Figure 5:
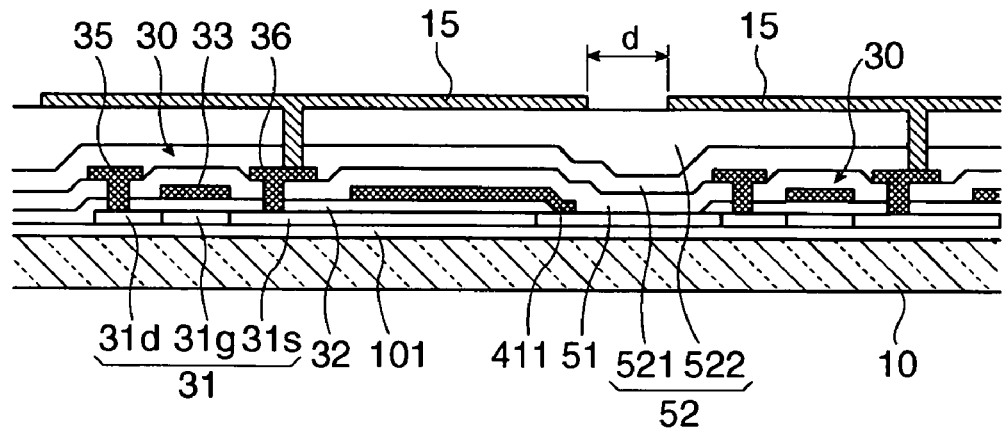
FIG. 5 is a cross-sectional view showing a detailed configuration of elements on a first substrate.

FIG. 5 is a cross-sectional view showing a specific configuration of elements on the surface of the first substrate 10. The elements in this figure other than the first substrate 10 and the pixel electrodes 15 are omitted in FIG. 3. As shown in FIG. 5, in the surfaces of the first substrate 10, the surface facing the second substrate 20 is entirely covered with an insulating layer 101. The insulating layer 101 is an insulating film member composed of, for example, silicon oxide. On the surface of the insulating layer, there are formed the transistors 30 shown in FIG. 2. The transistor 30 includes a semiconductor layer 31 composed of a drain region 31d, a source region 31s, and a gate region 31g formed therebetween, a gate insulating layer 32 covering the semiconductor layer 31, and a gate electrode 33 facing the gate region 31g across the gate insulating layer 32. The gate electrode 33 is a part branched from the scan line 11 shown in FIG. 1. The electrode 411 is formed in a section facing the source region 31s across the gate insulating layer 32. The holding capacitor 41 shown in FIG. 2 is composed of the electrode 411, the semiconductor layer 31, and the gate insulating layer 32 intervening therebetween.

The surface of the first substrate 10 on which the transistors 30 and the electrodes 411 are formed is covered with a first interlayer insulating layer 51. The drain electrode 35 formed on the surface of the first interlayer insulating layer 51 is a branch section of the data line 13 shown in FIG. 1, and is electrically connected to the drain region 31d of the semiconductor layer 31 via a contact hole passing through the first interlayer insulating layer 51 and the gate insulating layer 32. Meanwhile, the source electrode 36 formed on the surface of the first interlayer insulating layer 51 is electrically connected to the source region 31s of the semiconductor layer 31 via a contact hole passing through the first interlayer insulating layer 51 and the gate insulating layer 32. The surface of the first substrate 10 on which these elements are formed is covered with a second interlayer insulating layer 52 composed of a first layer 521 and a second layer 522. The second layer 522 is a film member for flattening a step of the first layer 521 corresponding to the shape of the transistor 30. Each of the pixel electrodes 15 is formed on the surface of the second layer 522, and is electrically connected to the source electrode 36 via a contact hole passing through the first layer 521 and the second layer 522. The pixel P shown in FIG. 2 is configured with the elements described above.

Figure 6:
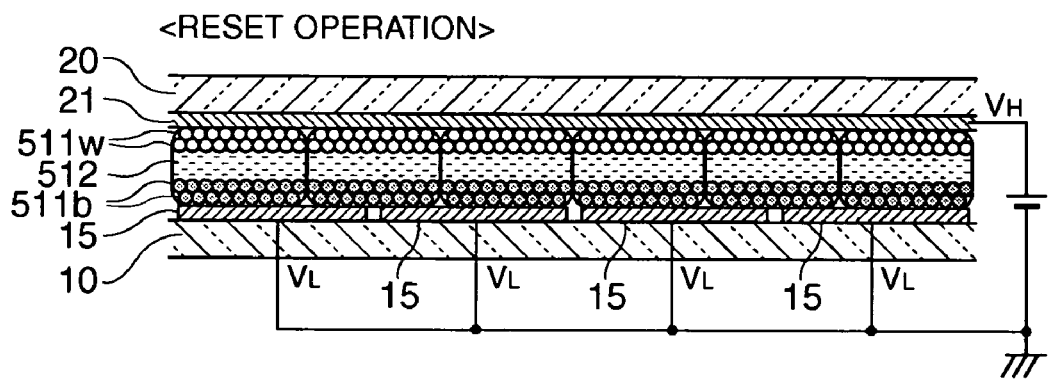
FIG. 6 is a cross-sectional view for explaining a reset operation.
Figure 7:
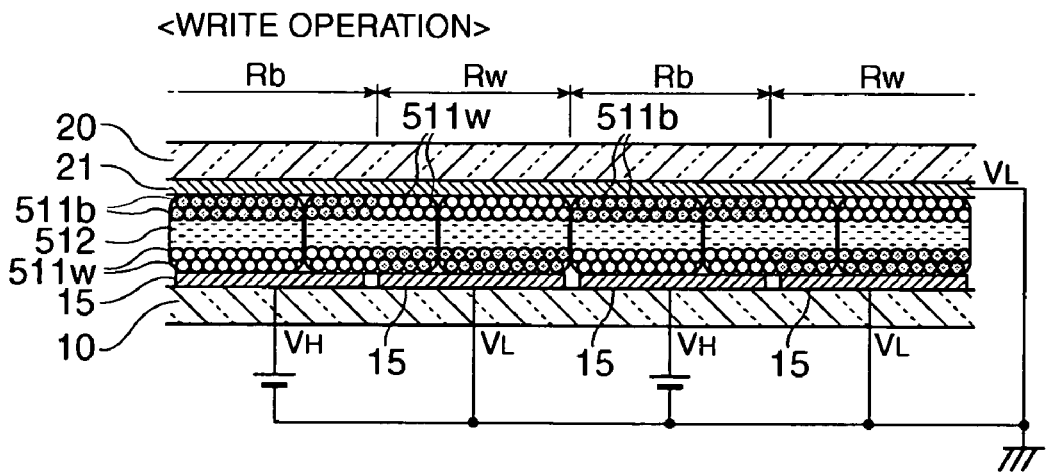
FIG. 7 is a cross-sectional view for explaining a display operation.

Operations of the electro-optic device D will now be described. The electro-optic device D of the present embodiment performs a reset operation for initializing the dispersion state of each of the electrophoretic particles 511 and a write operation (i.e., an operation for displaying an image corresponding to the image data Dg, hereinafter also referred to as a display operation) for changing the dispersion state of each of the electrophoretic particles 511 to a state corresponding to the image data Dg. FIG. 6 is a cross-sectional view schematically showing the electric potentials respectively applied to each of the pixel electrodes 15 and the opposed electrode 21 in the reset operation. FIG. 7 is a cross-sectional view schematically showing the electric potentials respectively applied to each of the pixel electrodes 15 and the opposed electrode 21 in the display operation.

As shown in FIG. 6, in the reset operation, the electric potential VL is applied to all of the pixel electrodes 15 as the data electric potentials while the common electric potential Vcom of the opposed electrode 21 is set to the electric potential VH. Therefore, in the electrophoretic particles 511 in each of the microcapsules 51, the negatively charged white electrophoretic particles 511w move closer to the opposed electrode 21 while the positively charged black electrophoretic particles 511b move closer to the pixel electrode 15. Accordingly, the image displayed in the display area Ad has a grayscale of white in all parts thereof.

In contrast, in the display operation, the common electric potential Vcom of the opposed electrode 21 is set to the electric potential VL while either of the electric potential VH or the electric potential VL selected for each of the pixels P corresponding to the image data Dg is applied to each of the pixel electrodes 15 as the data electric potential. As shown in FIG. 7, the negatively charged white electrophoretic particles 511w move closer to the pixel electrodes 15 to which the electric potential VH is applied while the positively charged black electrophoretic particles 511b move closer to the sections of the opposed electrode 21 corresponding to these pixel electrodes 15. Therefore, the areas (hereinafter referred to as black areas) Rb corresponding to the pixel electrodes 15 in the display area Ad, to which the electric potential VH is applied, shows the grayscale of black. On the contrary, in the pixel electrodes 15 to which the electric potential VL is applied, the electrophoretic particles do not move and are kept in the state achieved by the reset operation. Therefore, the areas (hereinafter referred to as white areas) Rw corresponding to the pixel electrodes 15 in the display area Ad, to which the electric potential VL is applied, shows the grayscale of white. By thus controlling the distribution state of the electrophoretic particles 511 for each of the pixel electrodes 15, a desired image corresponding to the image data Dg can be displayed in the display area Ad.

Figure 19:
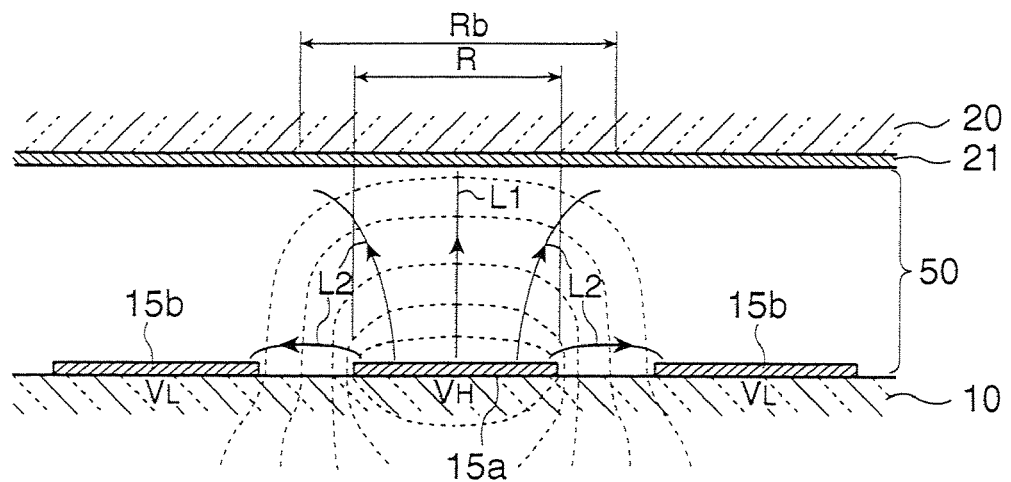
FIG. 19 is a cross-sectional view showing electric flux lines around each of the pixel electrodes of an electro-optic device.

In the display operation, as shown in FIG. 19, if the electric potential VH is applied to one pixel electrode 15a while the electric potential VL is applied to another pixel electrode 15b adjacent to the one pixel electrode 15a, the electric flux line L1 in the center section of the pixel electrode 15a extends in a direction perpendicular to the pixel electrode 15a to reach the opposed electrode 21 while the electric flux line L2 in the periphery of the pixel electrode 15a spreads towards the pixel electrode 15b. Resulting from the spread of the electric flux line L2, the black area Rb, in which the black electrophoretic particles 511b are distributed, becomes larger than the area R overlapping the pixel electrode 15a. In the present embodiment, the distance d between the pixel electrodes 15 is selected so that the black area Rb completely coincides with the unit area U. The relationship between the distance d and the black area Rb will be described in detail below.

Figure 8:
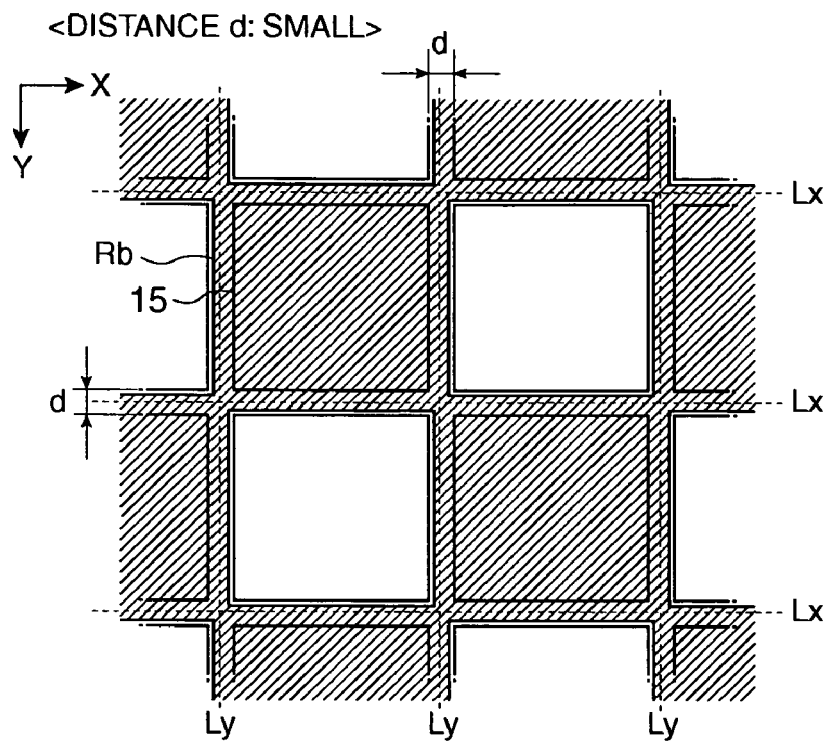
FIG. 8 is a plan view showing an image displayed with pixel electrodes having a small distance from each other.
Figure 9:
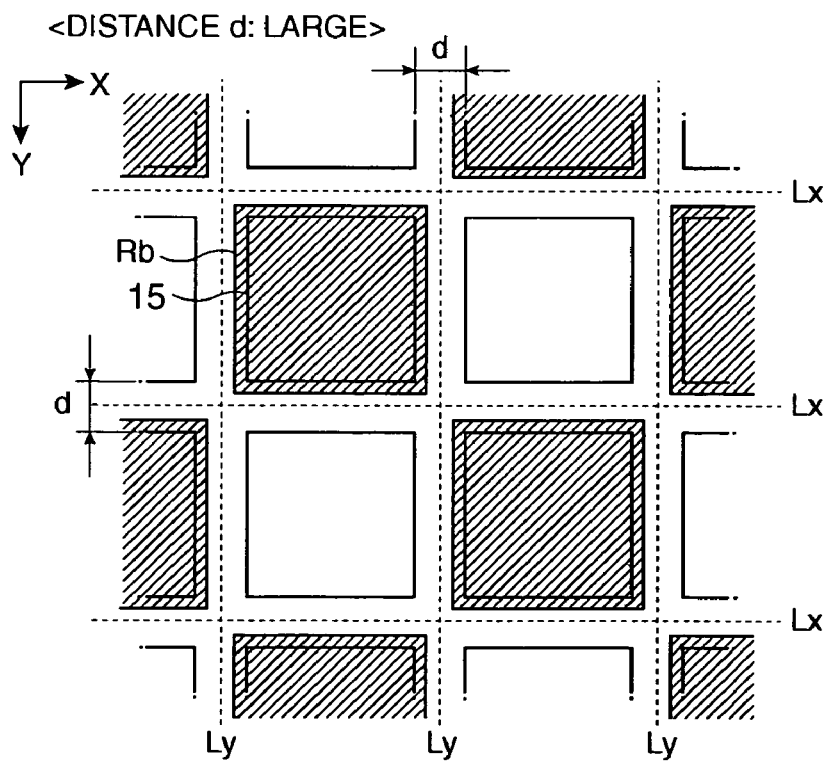
FIG. 9 is a plan view showing an image displayed with pixel electrodes having a large distance from each other.
Figure 10:
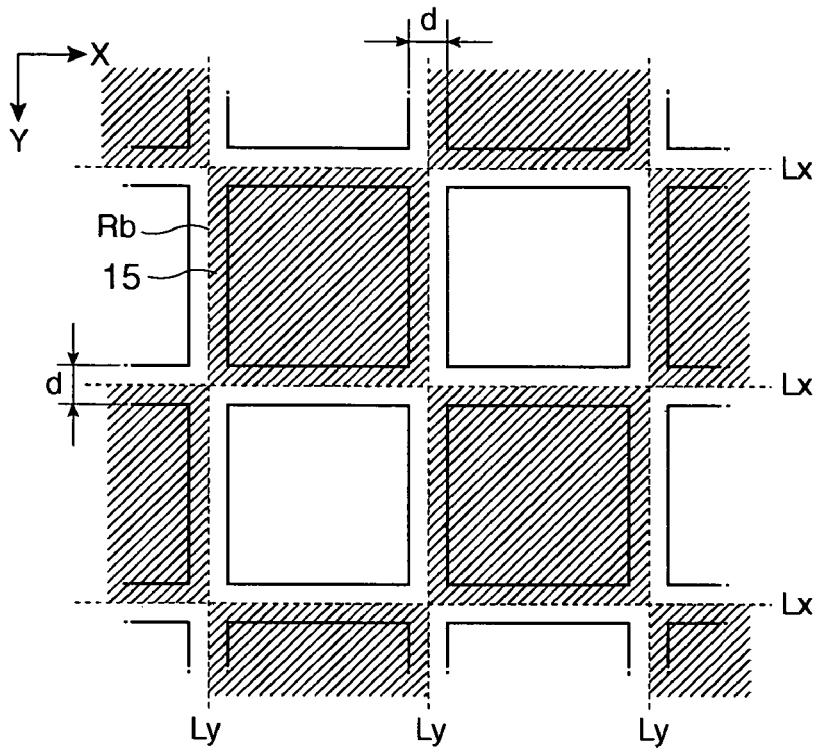
FIG. 10 is a plan view showing an image displayed with pixel electrodes having an appropriate value of distance from each other.

FIGS. 8 through 10 are plan views showing the relationship between the distance d of the pixel electrodes 15 and the black area Rb. In each of the figures, only for the sake of convenience of explanation, the case (i.e., the case in which a checkered pattern having pixels adjacent to each other in the X direction or the Y direction alternately displaying white and black is displayed) is assumed, in which either one of grayscales of black and white is displayed in one pixel P, and the other of the grayscales of black and white is displayed in the pixels P adjacent to the one pixel P in the X direction or the Y direction.

FIG. 8 is a plan view showing an appearance of the image actually displayed in the display area Ad if the distance d of the pixel electrodes 15 is small. As shown in the figure, in this case, the black area Rb is distributed in an area larger than the unit area U. Therefore, although the image (the checkered pattern) in which the total area of the black areas Rb and the total area of the white areas Rw are substantially the same is supposed to be displayed in the display area Ad, the image actually displayed therein has the black area Rb larger than the white areas Rw in the total area. On the same ground, a black line displayed by applying the electric potential VH to each of the pixel electrodes 15 arranged in a line in, for example, the X direction becomes wider than a desired size (the size of the unit area U), and accordingly, a narrower black line cannot be displayed. Further, when a white line is displayed in a black background by applying the electric potential VL to the pixel electrodes 15 arranged in a line in the X direction and applying the electric potential VH to the remaining pixel electrodes 15, the width of the white line becomes narrower than the unit area U, resulting in a problem that the visibility of the line cannot sufficiently be ensured.

Further, FIG. 9 is a plan view showing an appearance of the image actually displayed in the display area Ad if the distance d of the pixel electrodes 15 is large. As shown in the figure, since the black areas Rb can only be distributed in an area narrower than the unit area U in this case, each of the black areas Rb is arranged with a distance from each other. Therefore, the image actually displayed in the display area Ad has the white areas Rw larger than the black areas Rb in the total area. Further, if, for example, a black line is displayed in a white background by applying the electric potential VL to each of the pixel electrodes 15 extending in a line in the X direction and applying the electric potential VH to the remaining pixel electrodes 15, the image actually displayed therein problematically appears as a broken line formed of the black areas Rb arranged with gaps (i.e., separated into the pixel P).

In order for solving these problems, in the present embodiment, as shown in FIG. 10, the distance d between the pixel electrodes 15 is selected so that the black area Rb completely overlaps the unit area U (the condition is hereinafter referred to as a first condition). In other words, the boundary between the black area Rb corresponding to the pixel electrode 15a to which the electric potential VH is applied and the white area Rw corresponding to the pixel electrode 15b adjacent thereto is identical to the boundary between the unit area U provided with the pixel electrode 15a and the unit area U provided with the pixel electrode 15b. In further detail, if the maximum voltage between the pixel electrodes 15 and the opposed electrode 21 is about 10V, the distance d between the pixel electrodes 15 is selected in a range from about 5 μm to 15 μm, and further preferably set to about 10 μm. Further, focusing on the size (hereinafter referred to as a gap) G of a gap between the pixel electrode 15 and the opposed electrode 21, the distance d between the pixel electrodes 15 is selected to a value from a tenth to three-tenths of the gap G, and more preferably to a value of about a fifth of the gap G. By selecting the distance d so as to satisfy the above condition, the problems shown in FIGS. 8 and 9 can be resolved to make it possible to precisely display the desired image.

Figure 11:
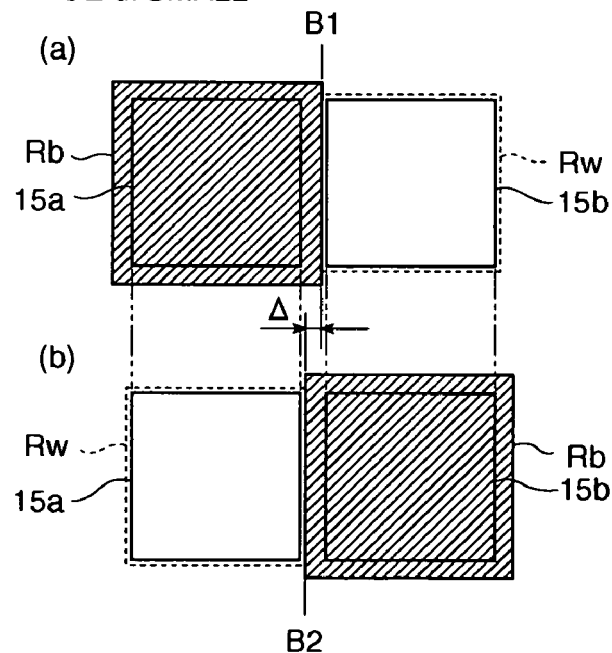
FIGS. 11A and 11B are plan views for explaining a condition of the distance between the pixel electrodes.

Conditions to be satisfied by the distance d between the pixel electrodes 15 can also be figured out from the following viewpoints. FIG. 11A is a plan view showing the relationship between the black area Rb and the white area Rw when the electric potential VH is applied to the pixel electrode 15a while the electric potential VL is applied to the pixel electrode 15b adjacent to the pixel electrode 15a under the configuration in which the distance d is set to be larger than the appropriate value. Further, FIG. 11B is a plan view showing the relationship between the black area Rb and the white area Rw when the electric potential VL is applied to the pixel electrode 15a while the electric potential VH is applied to the pixel electrode 15b under the same configuration in which the distance d is set to be larger than the appropriate value. If the distance d is larger than the appropriate value, the boundary B1 between the black area Rb and the white area Rw in the case of FIG. 11A and the boundary B2 between the black area Rb and the white area Rw in the case of FIG. 11B are shifted from each other as much as Δ. The same applies to the case in which the distance d is smaller than the appropriate value.

Figure 12:
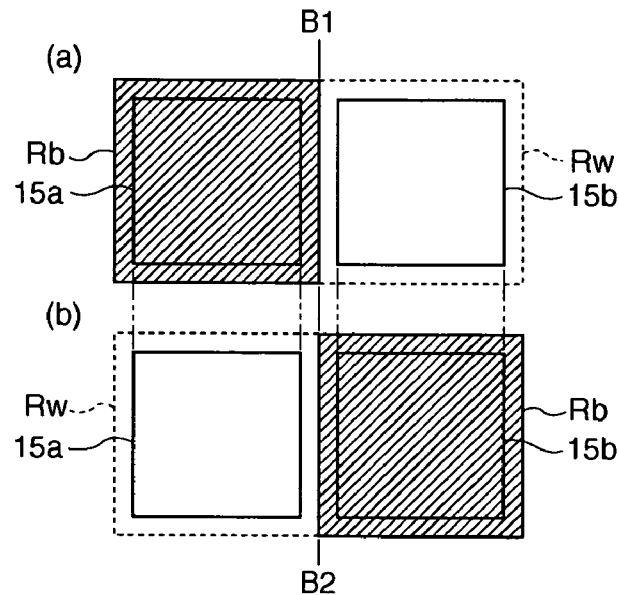
FIGS. 12A and 12B are plan views for explaining a condition of the distance between the pixel electrodes.

In contrast, FIG. 12A is a plan view showing the relationship between the black area Rb and the white area Rw when the electric potential VH is applied to the pixel electrode 15a while the electric potential VL is applied to the pixel electrode 15b under the configuration in which the distance d is set to be the appropriate value. And FIG. 12B is a plan view showing the relationship between the black area Rb and the white area Rw when the electric potential VL is applied to the pixel electrode 15a while the electric potential VH is applied to the pixel electrode 15b on the contrary. If the distance d is set to the appropriate value, the boundary B1 between the black area Rb and the white area Rw in the case of FIG. 12A and the boundary B2 between the black area Rb and the white area Rw in the case of FIG. 12B become substantially identical to each other. In other words, it can be said that the distance d between the pixel electrode 15a and the pixel electrode 15b is selected in the present embodiment so that the boundary B1 between the black area Rb generated by applying the electric potential VH to the pixel electrode 15a and the white area Rw generated by applying the electric potential VL to the pixel electrode 15b becomes substantially identical to the boundary B2 between the white area Rw generated by applying the electric potential VL to the pixel electrode 15a and the black area Rb generated by applying the electric potential VH to the pixel electrode 15b (the condition is hereinafter referred to as a second condition).

B: Second Embodiment

A second embodiment of the invention will hereinafter be described.

In the first embodiment, the configuration for displaying two levels of grayscales, black and white, using each of the pixels P as a unit of display is described as an example. On the contrary, a configuration capable of displaying halftone in addition to black and white using an area modulation method defining a set of plural pixels P as a unit of display is adopted in the present embodiment. Note that in the present embodiment, elements having the same functions and operations as those in the first embodiment are provided with common reference numerals and the descriptions therefor may be omitted if appropriate.

Figure 13:
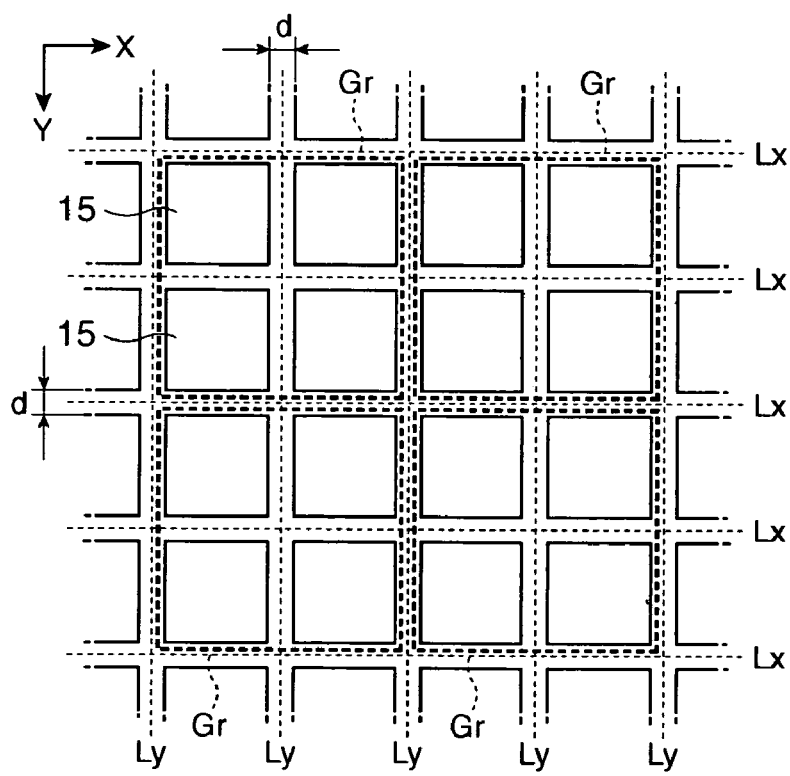
FIG. 13 is a plan view showing each of pixel electrodes of an electro-optic device according to a second embodiment.

FIG. 13 is a plan view showing the arrangement of the pixel electrodes 15 in the present embodiment. As shown in the figure, in the present embodiment, five levels of grayscale is displayed by the area modulation method using a set (hereinafter referred to as a unit electrode group) Gr of totally four pixel electrodes 15, vertically two lines and horizontally two columns, as a unit. Therefore, the image data Dg in the present embodiment is the data for designating for each of the unit electrode groups Gr either one of the grayscale values from "0" corresponding to black to "4" corresponding to white.

In this configuration, a desired grayscale is displayed by applying the electric potential VH to the number of pixel electrodes 15 out of four pixel electrodes 15 forming one unit electrode group Gr, the number corresponding to the grayscale value designated by the image data Dg, while applying the electric potential VL to the remaining pixel electrodes 15. For example, the grayscale corresponding to the grayscale value "0" is displayed by applying the electric potential VH to all the pixel electrodes 15 in the unit electrode group Gr, the grayscale corresponding to the grayscale value "1" is displayed by applying the electric potential VH to three of the pixel electrodes 15 while applying the electric potential VL to the remaining one pixel electrode 15, the grayscale corresponding to the grayscale value "2" is displayed by applying the electric potential VH to two of the pixel electrodes 15 while applying the electric potential VL to the remaining two electrodes 15, and so on.

Figure 14:
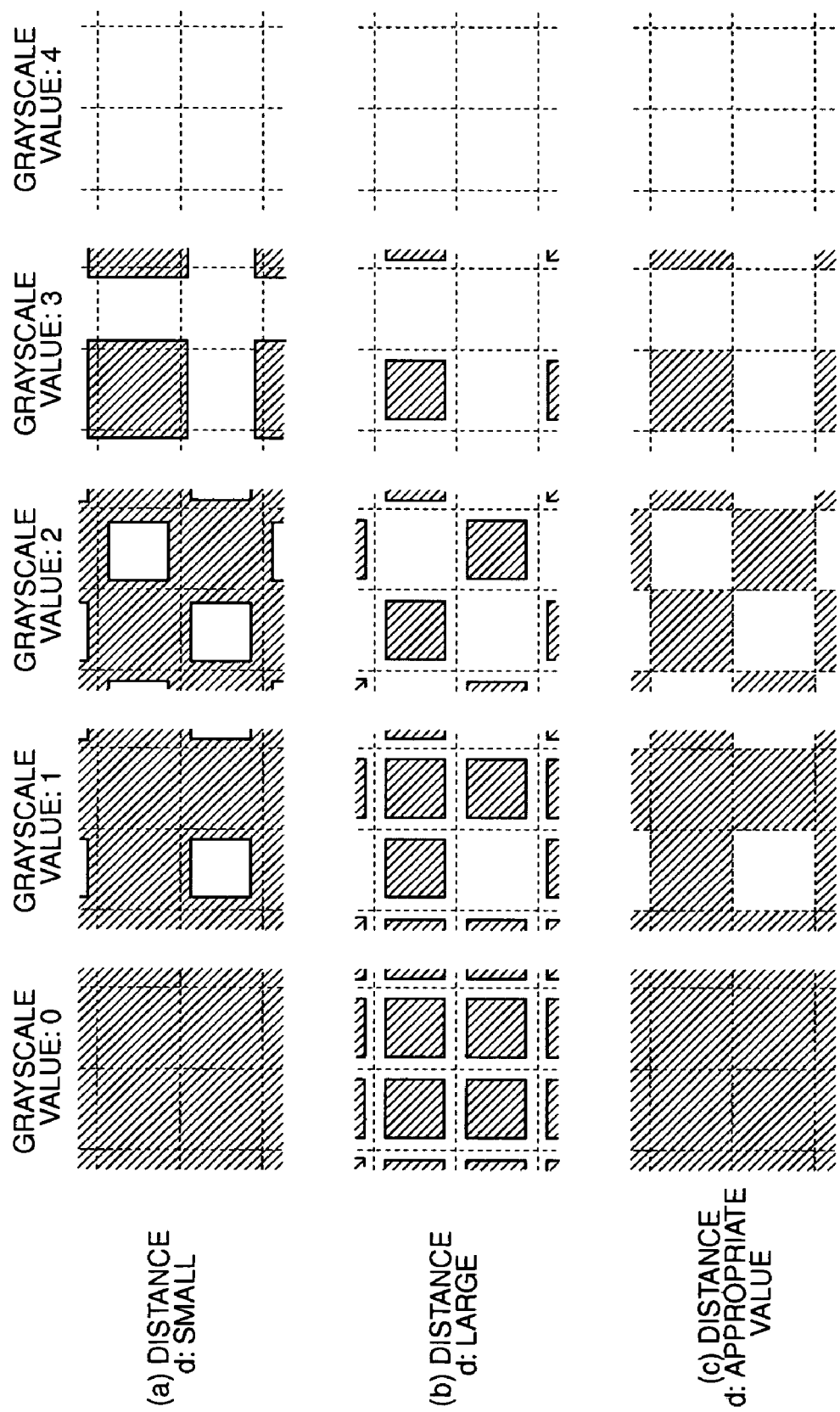
FIGS. 14A through 14C are plan views showing arrangements of the black areas and the white areas for respective grayscale values.
Figure 15:
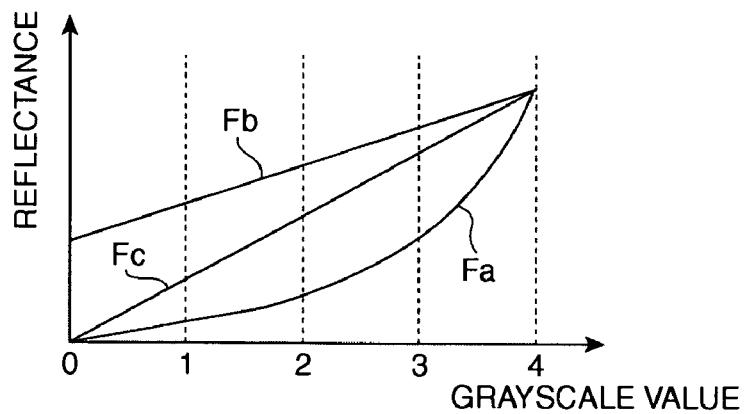
FIG. 15 is a chart showing the relationship between the grayscale value and the reflectance of a unit electrode group for each of the distance values between the pixel electrodes.
Figure 16:
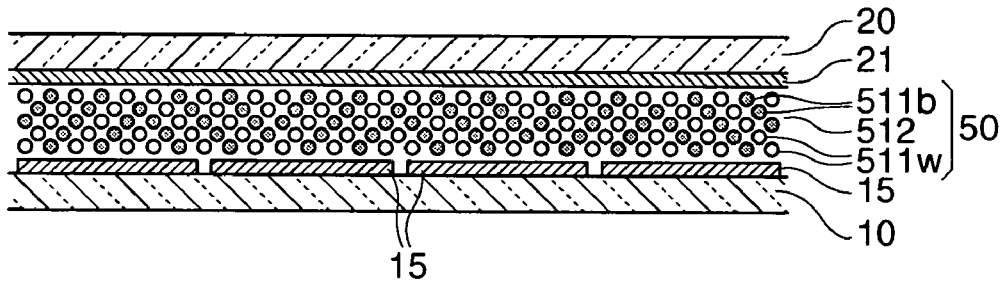
FIG. 16 is a cross-sectional view showing a configuration of an electro-optic device according to a modified embodiment.

FIGS. 14A through 14C are plan views showing the arrangement of the black areas Rb and the white areas Rw for each of the grayscale values designated by the image data Dg. FIG. 14A shows the case in which the distance d between the pixel electrodes 15 is small, FIG. 14B shows the case in which the distance d is large, and FIG. 14C shows the case in which the distance d is set to the appropriate value. Further, FIG. 15 is a chart showing the relationship between the grayscale value and the reflectance in the respective cases. In a graph shown in the figure, the reflectance represented in the vertical axis denotes a relative ratio (the total area of the white areas Rw/the total area of the black areas Rb) of the area of the white areas and the area of the black areas in one unit electrode group Gr. The characteristic curve Fa shown in FIG. 15 denotes the characteristic in the case (shown in FIG. 14A) in which the distance d between the pixel electrodes 15 is small, the characteristic curve Fb denotes the characteristic in the case (shown in FIG. 14B) in which the distance d between the pixel electrodes 15 is large, and the characteristic curve Fc denotes the characteristic in the case (shown in FIG. 14C) in which the distance between the pixel electrodes 15 is the appropriate value.

In the case in which the distance d between the pixel electrodes 15 is small, as described in the first embodiment, the black area Rb is distributed in an area larger than the unit area U. Therefore, as expressed by FIG. 14A and the characteristic curve Fa in FIG. 15, the reflectance of one unit electrode group Gr increases or decreases in a nonlinear manner in accordance with the change in the grayscale value designated by the image data Dg. For example, an increased amount of the reflectance when the grayscale value changes from three to four is larger than an increased amount of the reflectance when the grayscale value changes from zero to one. The image displayed with such a characteristic may be recognized by an observer as an unnatural image. In particular, when the grayscale value of one is designated, the image becomes to have a very small area of the white areas Rw as shown in FIG. 14A. Therefore, the reflectance with the grayscale value of one cannot be clearly distinguished by the observer from the reflectance with the grayscale value of zero.

Further, if the distance d between the pixel electrodes 15 is large, the black area Rb is only distributed in an area smaller than the unit area U as described in the first embodiment. Therefore, as shown in FIG. 14B and expressed by the characteristic curve Fb in FIG. 15, even when the grayscale value is zero, the white areas are distributed around each of the black areas Rb, and accordingly, the difference between the reflectance with the grayscale value of zero and the reflectance with the grayscale value of four is reduced. Therefore, the image actually displayed in the display area Ad becomes whity and poor in contrast as a whole.

In contrast, in the present embodiment, similarly to the first embodiment, the distance d between the pixel electrodes 15 is selected so that the black area Rb completely coincides with the unit area U. Therefore, as shown in FIG. 14C and expressed by the characteristic curve Fc in FIG. 15, the reflectance becomes zero in accordance with the grayscale value of zero, and increases or decreases in proportion to the change in the grayscale value. Therefore, high-grade images with clear contrast and naturally changing grayscale can be displayed in the display area Ad. Focusing on FIG. 14C and the characteristic curve Fc in FIG. 15, it can be recognized that, in the present embodiment, the distance d between the pixel electrodes 15 forming the unit electrode group Gr is selected so that the whole of one unit electrode group Gr including the four pixel electrodes 15 and the gaps between the pixel electrodes becomes the grayscale of black when the grayscale value of zero is designated for the unit electrode group Gr, and also the reflectance of the unit electrode group Gr is in proportion to the grayscale value designated by the image data Dg (the condition is hereinafter referred to as a third condition). Note that, although the distance d between the pixel electrodes 15 forming one unit electrode group Gr is mentioned here, the distance between each of the pixel electrodes 15 forming one unit electrode group and each of the pixel electrodes 15 forming another unit electrode group Gr adjacent thereto is also selected to satisfy the same conditions.

C: Modified Embodiments

Various modifications can be applied to each of the embodiments. Embodiments of the specific modifications will be described below. Note that the embodiments described below can be combined if desired.

Modified Embodiment 1

Although the configuration in which the electrophoretic dispersion liquid (the dispersion medium 512 dispersing the electrophoretic particles 511) is encapsulated in the microcapsule 51 is exemplified in each of the embodiments, a configuration in which the electrophoretic dispersion liquid is directly sealed in a gap between the first substrate 10 and the second substrate 20 can also be adopted, or a configuration in which the gap between the first substrate 10 and the second substrate 20 is partitioned by partitions (not shown) into a number of microscopic chambers each encapsulating the electrophoretic dispersion liquid can also be adopted. Further, although the configuration in which two kinds of electrophoretic particles 511 each having different color from the other is dispersed in the dispersion medium 512 is exemplified in each of the embodiments, a configuration in which the dispersion medium 512 provided with a specific color disperses a single kind of electrophoretic particles 511 having color different from the specific color can also be adopted. In this configuration, when the electrophoretic particles 511 move closer to the second substrate 20, the grayscale corresponding to the color of the electrophoretic particles 511 is displayed, and when the electrophoretic particles 511 move closer to the first substrate 10, the grayscale corresponding to the color of the dispersion medium 512 is displayed. Further, the color or the polarity of each of the electrophoretic particles 511 can be changed if desired. For example, the electrophoretic particles 511 having color other than black nor white can also be used, or a configuration in which the black electrophoretic particles 511b are charged negatively while the white electrophoretic particles 511w are charged positively can also be adopted contrary to each of the embodiments. As described above, in the embodiments in which the invention is applied to the electrophoretic device, it is enough that the electrophoretic dispersion liquid composed of the liquid dispersion medium 512 and positively or negatively charged particles of at least one color dispersed in the dispersion medium 512 is provided.

Modified Embodiment 2

Although the case in which the distance d between the pixel electrodes 15 adjacent to each other in the X direction is equal to the distance d between the pixel electrodes 15 adjacent to each other in the Y direction is exemplified in each of the embodiments, the distance between the pixel electrodes 15 in the X direction can be different from the distance between the pixel electrodes 15 in the Y direction. Further, in the invention, it is enough that at least either one of the distance between the pixel electrodes 15 adjacent to each other in the X direction or the distance between the pixel electrodes 15 adjacent to each other in the Y direction satisfy the first through the third conditions.

Modified Embodiment 3

The configuration of each of the pixels P is not limited. For example, although the active matrix type of electro-optic device D equipped with the switching elements for controlling voltages applied to the pixel electrodes is exemplified in each of the embodiments, the invention can also be applied to the passive matrix type of electro-optic device without such switching elements. Further, although the configuration in which the opposed electrode 21 is disposed on the observation side of the electro-optic layer 50 and each of the pixel electrodes 15 is disposed on the reverse side is exemplified in each of the embodiments, contrary to this configuration, a configuration in which each of the pixel electrodes 15 is disposed on the observation side while the opposed electrode 21 is disposed on the reverse side can also be adopted. In this configuration, each of the pixel electrodes 15 is made of an electrically conductive material having light permeability such as ITO. Further, the electric potentials applied to each of the pixel electrodes 15 or the opposed electrode 21 can be changed as desired. For example, a configuration (i.e., a configuration using three kinds of electric potential), in which the common electric potential Vcom is maintained constant in both of the reset operation and the write operation while a higher electric potential or a lower electric potential with respect to the common electric potential Vcom is selectively applied to each of the pixel electrodes 15, can also be adopted.

Modified Embodiment 4

Figure 17:
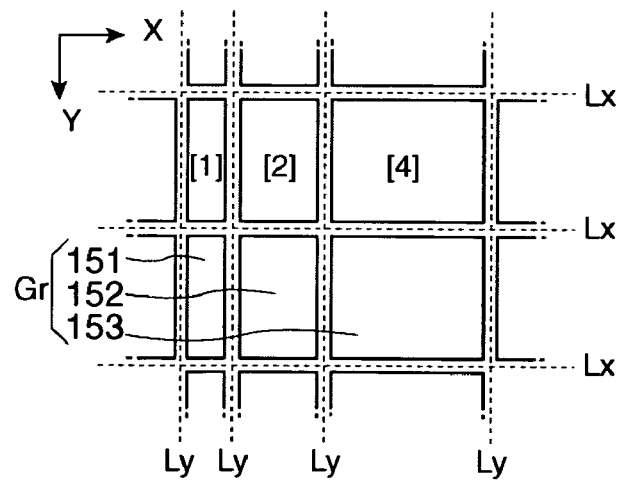
FIG. 17 is a cross-sectional view showing a configuration of a unit electrode group of an electro-optic device according to a modified embodiment.

Although in the second embodiment the case in which one unit electrode group Gr is composed of four pixel electrodes 15 having the same shapes is exemplified, the number of the pixel electrodes 15 or the shape of each of the pixel electrodes 15 included in one unit electrode group Gr can be changed as desired. For example, as shown in FIG. 17, one unit electrode group Gr can be composed of a plurality pixel electrodes 15 (151, 152, 153) differing from each other in the area. In this configuration, the area of each of the pixel electrodes 15 has a weight corresponding to the power of two (i.e., the ratios of the areas are "1:2:4" as additionally noted in FIG. 17). Although the shapes of the unit areas U differ for each of the pixel electrodes 15 in this configuration, the same operation and advantages can be obtained by selecting the distance between the pixel electrodes 15 so as to satisfy the second condition described in the first embodiment of the third condition described in the second embodiment.

Further, a configuration in which the grayscale is expressed using another method than the area modulation method can also be adopted. For example, a configuration in which the halftone is displayed by applying to the pixel electrode 15 an intermediate electric potential between the electric potential VH and the electric potential VL can be adopted. As described above, admitting that only the first electric potential and the second electric potential are specified in the invention, this does not mean that a configuration in which an electric potential other than these electric potentials is applied to the pixel electrode 15 is excluded.

Modified Embodiment 5

Although the electro-optic device D displaying contrast by the migration of the electrophoretic particles 511 is exemplified in each of the embodiments, the configuration of the electro-optic layer according to the invention is not limited to this configuration. The invention can be applied to various electro-optic devices such as, for example, a liquid crystal device utilizing liquid crystal, a display device utilizing twisting balls provided with different colors for each of areas differing in polarity, or a display device utilizing a toner of at least one color. In other words, any layers including an electro-optic material whose optical characteristics (transmittance or reflectance) vary in accordance with the electric potential of each of the pixel electrodes can be suited to the electro-optic layer in the invention.

D: Electronic Instrument

Hereinafter, an electronic instrument implementing the electro-optic device according to the embodiment of the invention will be described.

Figure 18:
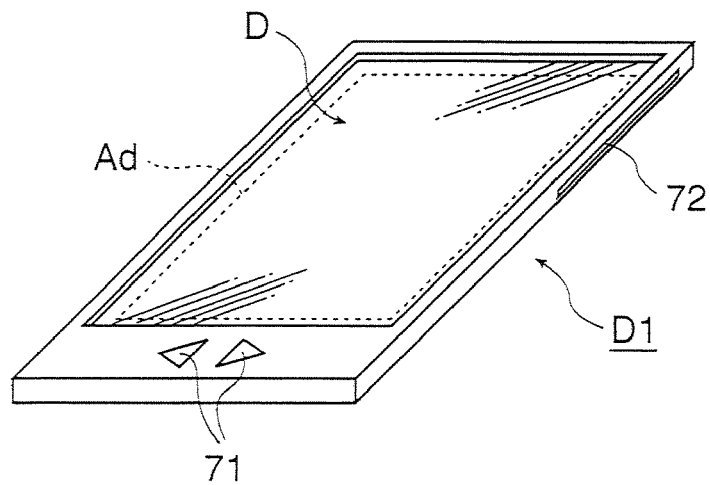
FIG. 18 is a perspective view showing a configuration of an electronic book as an example of an electronic instrument according to an embodiment of the invention.

FIG. 18 is a perspective view showing a configuration of an electronic book applying the electro-optic device D according to each of the embodiments. As shown in the figure, the electronic book D1 includes the electro-optic device D according to each of the embodiments, and a plurality of switches 71 for receiving operations by the user. When a recording medium such as a portable semiconductor memory or an optical disc is inserted in a slot 72, the image data Dg of a book stored in the recording medium is read out, and then the first page is displayed in the display area Ad of the electro-optic device D. The user can change the page displayed in the display area Ad by appropriately operating the switches 71. Since the electrophoretic particles 511 do not migrate unless an electric field is applied, the image displayed in the display area Ad is maintained even if a drive method of performing the write operation only when a page change is instructed by operating the switches 71 (i.e., power supply is stopped while the image is maintained) is adopted. Therefore, the power consumption can be dramatically reduced compared to other electro-optic devices such as a liquid crystal device.

As electronic instruments implementing the electro-optic device according to the invention, in addition to the electronic book exemplified above, a portable personal computer, a cellular phone, a portable information terminal (PDA: Personal Digital Assistants), a digital still camera, a television, a video camera, a car navigation device, a pager, an electronic notepad, a word processor, a workstation, a picture phone, a POS terminal, a printer, a scanner, a copier, a video player, an instrument equipped with a touch panel, and so on can be cited.

The entire disclosure of Japanese Patent Application No. 2005-043533, filed Feb. 21, 2005 is expressly incorporated by reference herein.

What is claimed is:

1. An electro-optic device, comprising:
a plurality of pixel electrodes each formed for respective unit areas with a distance between one of the pixel electrodes and another of the pixel electrodes adjacent to the one of the pixel electrodes, the unit areas being arranged in a plane and defined by dividing the plane into the same shapes without a gap; and
an electro-optic layer that faces each of the pixel electrodes, and in response to application of a first electric potential to each of the pixel electrodes, expresses a first grayscale in an area corresponding to each of the pixel electrodes, in response to application of a second electric potential different form the first electrical potential to each of the pixel electrodes, expresses a second grayscale different from the first grayscale in an area corresponding to each of the pixel electrodes,
wherein the distance between one of the pixel electrodes and another of the pixel electrodes adjacent to the one of the pixel electrodes is selected so that a boundary between an area expressing the first grayscale in response to application of the first electric potential to the one of the pixel electrodes and an area expressing the second grayscale in response to application of the second electric potential to the another of the pixel electrodes adjacent to the one of the pixel electrodes is substantially identical to a boundary between the unit area provided with the one of the pixel electrodes and the unit area provided with the another of the pixel electrodes.

2. The electro-optic device according to claim 1, wherein the electro-optic layer includes charged particles and a dispersion medium dispersing the charged particles.

3. An electronic instrument comprising the electro-optic device according to claim 1.

4. An electro-optic device comprising:
a plurality of pixel electrodes arranged in a plane with a distance from an adjacent one of the pixel electrodes; and
an electro-optic layer that faces each of the pixel electrodes, and in response to application of a first electric potential to each of the pixel electrodes, expresses a first grayscale in an area corresponding to each of the pixel electrodes, in response to application of a second electric potential different form the first electrical potential to each of the pixel electrodes, expresses a second grayscale different from the first grayscale in an area corresponding to each of the pixel electrodes,
wherein the distance from an adjacent one of the pixel electrodes is selected so that a boundary between an area expressing the first grayscale in response to application of the first electric potential to one of the pixel electrodes and an area expressing the second grayscale in response to application of the second electric potential to another of the pixel electrodes adjacent to the one of the pixel electrodes is substantially identical to a boundary between an area expressing the second grayscale in response to application of the second electric potential to the one of the pixel electrodes and an area expressing the first grayscale in response to application of the first electric potential to the another of the pixel electrodes adjacent to the one of the pixel electrodes.

5. An electro-optic device, comprising:
a plurality of unit electrode group each including a predetermined number of pixel electrodes arranged in a plane with a distance from an adjacent one of the pixel electrodes; and
an electro-optic layer that faces each of the pixel electrodes, and in response to application of a first electric potential to each of the pixel electrodes, expresses a first grayscale in an area corresponding to each of the pixel electrodes, in response to application of a second electric potential different form the first electrical potential to each of the pixel electrodes, expresses a second grayscale different from the first grayscale in an area corresponding to each of the pixel electrodes,
wherein the first grayscale, the second grayscale, and a intermediate grayscale between the first grayscale and the second grayscale are expressed for each of the unit electrode groups by applying the first electric potential to the number of pixel electrodes out of the predetermined number of the pixel electrodes forming the unit electrode group corresponding to a grayscale value designated to the unit electrode group while applying the second electric potential to the remaining pixel electrodes in the unit electrode group, and
the distance from an adjacent one of the pixel electrodes is selected so that the whole of one of the unit electrode groups including the pixel electrodes and a gap between the pixel electrodes expresses the first grayscale in response to designation of specific grayscale to the one of the unit electrode groups, and a ratio of the total area expressing the first grayscale and the total area expressing the second grayscale is in proportion to the grayscale value designated to the one of the unit electrode groups.

6. An electro-optic device, comprising:
a plurality of pixel electrodes arranged in a matrix, the plurality of pixel electrodes including a first pixel electrode and a second pixel electrode disposed adjacent to each other, a space being formed between the first pixel electrode and the second pixel electrode;
an electro-optic layer placed over the first pixel electrode, second pixel electrode and the space, the electro-optic layer including a plurality of charged particles; and
an opposed electrode placed over the electro-optic layer and facing the first pixel electrode, the second pixel electrode and the space,
wherein d/G is equal to or greater than $\frac{1}{10}$, and is equal to or smaller than $\frac{3}{10}$ when a distance between the first pixel electrode and the second pixel electrode is d, and a gap formed between the opposed electrode and at least one of the first pixel electrode and the second pixel electrode is G.

7. The electro-optic device according to claim 6, wherein the electro-optic layer expresses a first grayscale in an area corresponding to one of the first pixel electrode and the second pixel electrode in response to application of a first electric potential to the one of the first pixel electrode and the second pixel electrode, and expresses a second grayscale different from the first grayscale in an area corresponding to one of the first pixel electrode and the second pixel electrode in response to application of a second electric potential different from the first electrical potential to the one of the first pixel electrode and the second pixel electrode, and wherein a boundary between an area expressing the first grayscale in response to application of the first electric potential to the first pixel electrode and an area expressing the second grayscale in response to application of the second electric potential to the second pixel electrode is substantially identical to a boundary between an area expressing the second grayscale in response to application of the second electric potential to the first pixel electrode and an area expressing the first grayscale in response to application of the first electric potential to the second pixel electrode.

8. The electro-optic device according to claim 6, wherein the electro optic layer includes a dispersion medium dispersing the charged particles.

9. An electronic instrument comprising the electro-optic device according to claim 6.

* * * * *

UNITED STATES PATENT AND TRADEMARK OFFICE
CERTIFICATE OF CORRECTION

| | | |
|---|---|---|
| PATENT NO. | : 7,605,798 B2 | Page 1 of 1 |
| APPLICATION NO. | : 11/332869 | |
| DATED | : October 20, 2009 | |
| INVENTOR(S) | : Yuko Komatsu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Fourteenth Day of December, 2010

David J. Kappos
*Director of the United States Patent and Trademark Office*